United States Patent
Bigand

(10) Patent No.: US 9,557,835 B2
(45) Date of Patent: Jan. 31, 2017

(54) TRACKBALL BRAKE

(71) Applicant: THALES, Courbevoie (FR)

(72) Inventor: Jean-Louis Bigand, Vendome (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/677,896

(22) Filed: Apr. 2, 2015

(65) Prior Publication Data

US 2015/0286300 A1 Oct. 8, 2015

(30) Foreign Application Priority Data

Apr. 4, 2014 (FR) ...................................... 14 00827

(51) Int. Cl.
*G06F 3/0354* (2013.01)
*B64C 13/04* (2006.01)

(52) U.S. Cl.
CPC ........... *G06F 3/03549* (2013.01); *B64C 13/04* (2013.01)

(58) Field of Classification Search
CPC .... G06F 3/033; G06F 3/0354; G06F 3/03541; G06F 3/03549; B64C 13/00; B64C 13/02; B64C 13/04
See application file for complete search history.

(56) References Cited

U.S. PATENT DOCUMENTS

| | | | | |
|---|---|---|---|---|
| 5,062,853 A | * | 11/1991 | Forte | A61F 2/32 623/22.2 |
| 6,222,525 B1 | * | 4/2001 | Armstrong | A63F 13/06 345/161 |
| 6,421,043 B1 | * | 7/2002 | Uno | G06F 3/0338 345/156 |
| 2003/0073996 A1 | * | 4/2003 | Doubler | A61B 17/7035 606/301 |
| 2007/0083115 A1 | * | 4/2007 | Lee et al. | G06F 3/03549 600/437 |
| 2012/0038495 A1 | | 2/2012 | Ishikawa | |

FOREIGN PATENT DOCUMENTS

WO 2004/038575 A2 5/2004

* cited by examiner

*Primary Examiner* — Nathan Danielsen
(74) *Attorney, Agent, or Firm* — Baker & Hostetler LLP

(57) ABSTRACT

A trackball that is used notably for pointing at objects on a screen of a computer system comprises a body that is intended to be fixed to a workstation, a sphere that is rotatable with respect to the body, a set of sensors that provide information relating to the relative position of the sphere with respect to the body, and braking means for braking the rotational movements of the sphere with respect to the body. The braking means comprise a friction ring that encircles the sphere. The ring extends mainly in a plane perpendicular to an axis of symmetry of the sphere. The ring is free to move translationally in the plane in which the ring extends.

8 Claims, 2 Drawing Sheets

TRACKBALL BRAKE

CROSS-REFERENCE TO RELATED APPLICATIONS

This application claims priority to foreign French patent application No. FR 1400827, filed on Apr. 4, 2014.

BACKGROUND OF THE INVENTION

The invention relates to a trackball that is used notably for pointing at objects on a screen of a computer system.

A trackball is understood to be an assembly having a fixed body and a movable part such as a sphere, for example. The fixed part comprises sensors for providing information that is representative of the position of the sphere with respect to the fixed part. The information may be associated with a position on the screen by means of a computer of the piece of equipment. An operator moves the sphere with his fingers in order to reach a desired position on the screen and thus to point at an object displayed on the screen.

The invention is particularly useful for a trackball belonging to an item of equipment installed on board an aircraft. The trackball can thus be used to select flight parameters that are displayed on the screen of the system. More generally, the trackball makes it possible to point at objects displayed on the screen.

The aircraft can be subjected to turbulence which is likely to make it more difficult to point at objects. More precisely, the turbulence generates vibrations, which can result in uncontrolled movements of the sphere. Even in the absence of turbulence as such, minor acceleration phenomena to which the equipment is subjected prevent members of crew from pointing at a graphical zone beyond a certain degree of precision.

A conventional solution to this problem consists in oversizing the objects which are selectable on the screen so as to take this limitation into account. As a result, this reduces the number of objects that can be displayed on a given display surface.

Attempts have also been made to stabilize the operator's hand by creating suitable support surfaces. One example is given in the patent application published under the number EP 1 552 376, where the fixed part of the trackball has an ergonomic shape intended to take the operator's palm, hence its name of "palm rest". However, such a palm rest is unable to completely stabilize the sphere through the operator's fingers.

These two solutions are often associated with means for braking the sphere. These means make it possible to limit the uncontrolled movements of the sphere in the event of vibrations.

The brake is of course secured to the fixed part of the trackball and exerts a force on the sphere for example by means of a pad that rubs against the sphere. During movements of the sphere, the pressing of the pad generates a friction torque which opposes rotations of the sphere. The pad is kept pressed against the sphere by means of a spring that bears against the fixed part.

Assuming that the sphere is accessible to the operator's fingers from above, one solution that has already been implemented consists in positioning a friction surface on the ball above the plane of symmetry of the sphere. The friction surface is generally realized by a membrane made of plastics material. The force exerted along the vertical axis of the sphere by the friction surface is realized by an elastomer or a spring system that applies pressure to the friction surface.

This arrangement brings about a number of problems. The area that is usable by the operator is reduced on account of the presence of the friction surface above the plane of symmetry of the sphere.

The friction torque generated by the brake is highly dependent on the precision of coaxiality between the vertical axis of the sphere and the axis of the friction surface. The sphere is generally positioned on pivots that form sensors for providing information relating to the position of the sphere with respect to the fixed part. The deviation between the axes of the sphere and of the brake depends on a chain of dimensions that passes through numerous mechanical parts. The precision of coaxiality requires precise assembly and machining operations.

The friction torque generated depends on the pressure exerted by the elastic device, this pressure depending itself on the vertical position of the sphere. In order to limit this dependence, provision can be made of vertical wedging means of the brake. This solution is expensive since the wedging means need to be adjusted jointly for each trackball.

The torque generated also varies greatly depending on the variations in diameter of the sphere, in particular during variations in temperature, causing said sphere to rise against the braking device when it is used at high temperature or to lower when it is used at low temperature.

Moreover, the friction torque is set when the trackball is assembled. In order to modify this setting, it is necessary to remove the brake, this being difficult to accept in the aeronautical field.

Finally, it has been found that the brake is particularly delicate when used outside its normal use position, such as if it is turned over during transport.

SUMMARY OF THE INVENTION

The invention aims to remedy all or some of the problems cited above by proposing a trackball that has a brake which is much more tolerant with respect to dimensional variations of the various mechanical parts of which the trackball is made.

To this end, the subject of the invention is a trackball comprising a body that is intended to be fixed to a workstation, a sphere that is rotatable with respect to the body, a set of sensors that provide information relating to the relative position of the sphere with respect to the body, and a brake for braking the rotational movements of the sphere with respect to the body, wherein the brake comprises a friction ring that encircles the sphere, the ring extending mainly in one plane, the ring being free to move translationally in the plane in which the ring extends.

BRIEF DESCRIPTION OF THE DRAWING

The invention will be understood better and further advantages will become apparent from reading the detailed description of an embodiment that is given by way of example, said description being illustrated by the appended drawing, in which.

For the sake of clarity, the same elements will bear the same references in the various figures.

DETAILED DESCRIPTION OF THE PREFERRED EMBODIMENT

Figure 1:
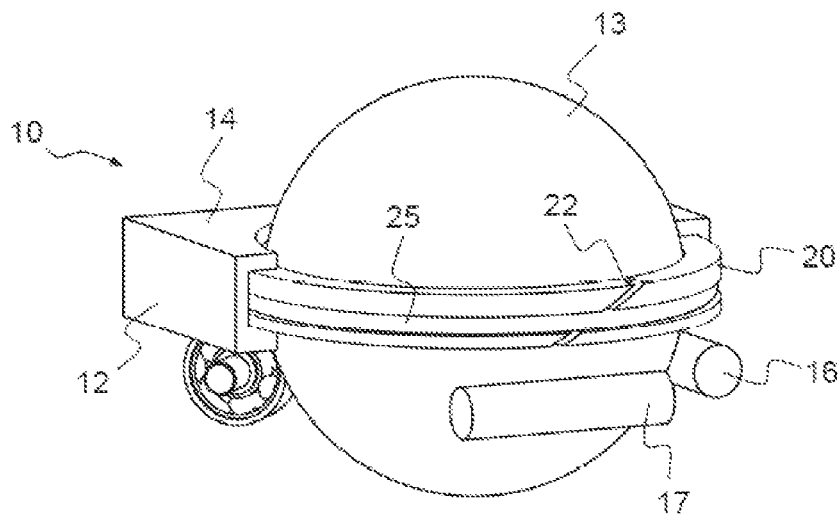
FIG. 1 shows a perspective view of a trackball according to the invention.

FIG. 1 shows a perspective view of a trackball 10 intended to be actuated by an operator's hand. The trackball 10 comprises a fixed body 12 and a sphere 13 that the operator can rotate with respect to the fixed body 12. In the example shown, the fixed body 12 comprises a plate 14 that is intended to be fixed to a workstation, for example an aircraft instrument panel. The trackball 10 comprises a set of sensors that provide information relating to the relative position of the sphere 13 with respect to the fixed body 12.

Figure 2:
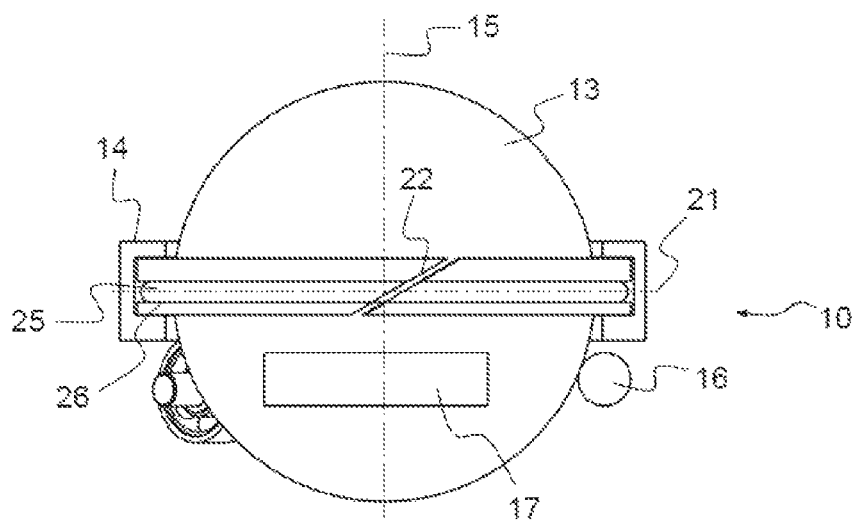
FIG. 2 shows a front view of the trackball.

FIG. 2 shows a front view of the trackball 10. This view is perpendicular to the plate 14. The workstation in which the trackball 10 is installed can be formed by a horizontal working plane in the vicinity of the trackball 10. The plate 14 is thus also horizontal. The sphere 13 comprises a part that protrudes above the plate 14. It is this part of the sphere that the operator manipulates with his fingers. The set of sensors is located under the plate 14 inside the fixed body 12. A trackball 10 implementing the invention can of course be positioned on an inclined working plane. An axis 15 of symmetry of the sphere 13 is defined, the axis 15 being perpendicular to the plate 14. The axis 15 is vertical if the plane of the plate 14 is horizontal.

The set of sensors comprises for example two rollers 16 and 17 that roll in a frictionless manner against the sphere 13 and each make it possible to know the angular position of the sphere 13 about axes parallel to the plane of the plate 14. The rollers 16 and 17 are for example each fixed to the rotor of an angular encoder that provides the information relating to the relative position of the sphere 13. Further types of sensors may be used, for example optical sensors or magnetic sensors that are sensitive to the movements of the sphere 13. The information coming from the set of sensors is transmitted to a computer that may be part of the trackball 10 or remote therefrom. The computer is configured to decode the information received from the angular encoders associated with the rollers 16 and 17. The computer sends for example the decoded information to the core of a computer system comprising a screen on which a pointer can move depending on the information.

When the environment in which the trackball is installed can be subjected to vibrations, the latter can bring about uncontrolled movements of the sphere 13. In order to limit these movements, the trackball comprises braking means for braking the rotational movements of the sphere 13 with respect to the body 12. According to the invention, the braking means comprise a friction ring 20 encircling the sphere 13. The friction of the ring 20 against the sphere 13 generates a resistive torque that makes it possible to brake the rotational movements of the sphere 13.

The ring extends mainly in a plane 21 perpendicular to the axis 15, that is to say parallel to the plate 14. The ring 20 has a circular annular shape in the plane 21. In practice, the ring 20 has a certain thickness perpendicularly to the plane 21. The thickness of the ring 20 is much less than the diameter of the ring 20 in the plane 21. Around its entire diameter, the ring contains the plane 21.

The sphere 13 is positioned on the rollers 16 and 17. In order to relax the chain of dimensions connecting the sphere 13 to the braking means, the ring 20 is free to move translationally in the plane 21. In other words, the ring 20 has two degrees of translational freedom in the plane 21. These two degrees of freedom, combined with the friction of the ring 20 against the surface of the sphere 13, allow the ring 20 to automatically center its diameter on the sphere 13 and more precisely on its axis 15.

Advantageously, the plane 21 in which the ring 20 extends is a plane of symmetry of the sphere 13. In other words, the plane 21 intersects the sphere through a large diameter of the sphere 13. The ring 20 rubs against a diameter of the sphere 13. The fact that the plane 21 is disposed at the level of a plane of symmetry of the sphere 13 makes it possible to increase the surface area of the protruding part of the sphere 13 to a maximum, while ensuring that the sphere 13 is held in the fixed part 12 of the trackball.

Alternatively, the plane 21 can be disposed such that the protruding part of the sphere 13 is smaller for reasons of installation in the workstation in which the trackball 10 is installed. It is thus possible to increase the surface area of the protruding part of the sphere 13 beyond the plane of symmetry of the sphere 13.

Advantageously, the ring 20 is slit. In other words, the ring 20 forms an open circular annulus. A slit 22 for producing this opening is visible in the two FIGS. 1 and 2. The slit gives the ring a degree of elasticity allowing it to adapt to deviations in the diameter of the sphere 13. These deviations are for example due to the manufacturing tolerances of the sphere 13 or to thermal expansions of the sphere 13 during the use thereof. The adaptation of the ring 20 also allows it to compensate for wear to its friction surface, this necessarily occurring throughout the use of the trackball 10. The slit 22 can be perpendicular to the plane 21 or inclined, as shown in the figures.

Two features of the material of the ring 20 are used to allow it to fulfill its function of braking the sphere 13: firstly, the elasticity of the ring 20 characterizes its dimensions and its Young's modulus allows it to exert a clamping force on the sphere 13. Secondly, the ring 20/sphere 13 coefficient of friction allows it to quantify the friction torque associated with the clamping force.

It is possible to separate these two features by adding an additional elastic element for clamping the ring 20 against the sphere 13. To this end, the braking means advantageously comprise an annular spring 25 that extends in the plane 21 and compresses the ring 20 against the sphere 13. The spring 25 can be disposed in a groove 26 made in the ring 20.

The ring 20 is made for example of polytetrafluoroethylene (PTFE). This material has a Young's modulus that is too low to ensure a sufficient force of the ring against the sphere 13. For this purpose, the clamping of the ring 20 on the sphere by means of a spring made for example of spring steel wire. Furthermore, polytetrafluoroethylene has a relatively low coefficient of friction. This has the advantage of reducing the sensation of dry friction and detachment occurring when an operator starts to move the sphere.

Figure 3:
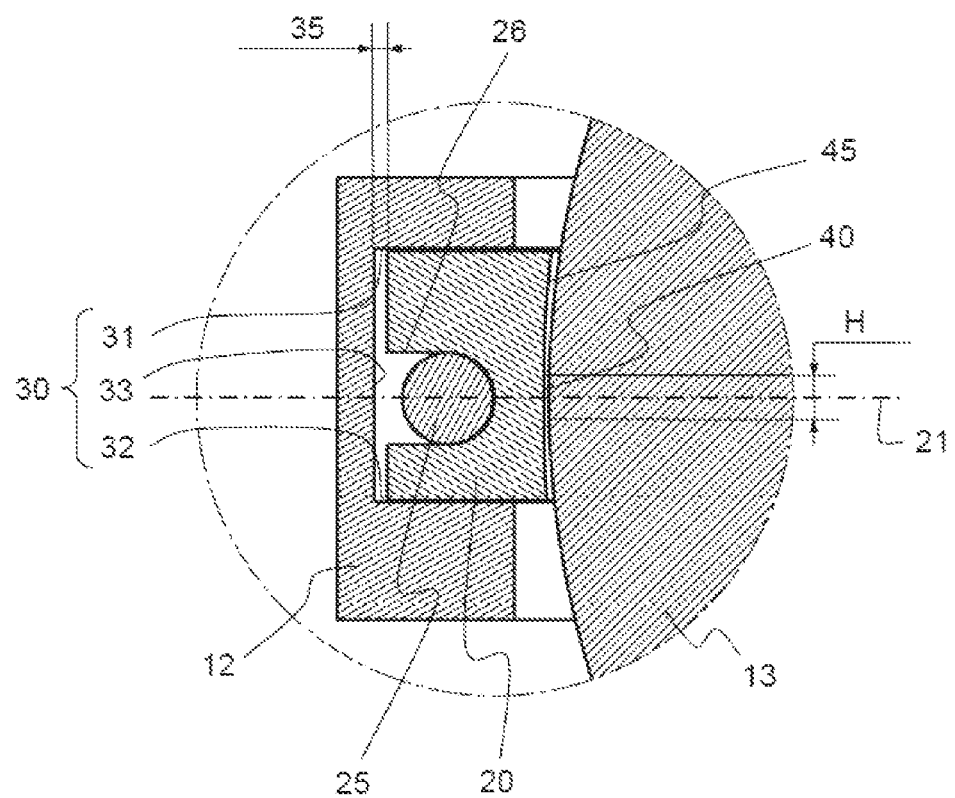
FIG. 3 shows a partial section through the trackball.

FIG. 3 shows the connection between the ring 20 and the body 12 in partial section. In order to ensure the translational freedom of the ring 20 with respect to the body 12 in the plane 21, the body 12 comprises a groove 30 extending in the plane 21. Like the ring 20, the groove is annular and centered on the axis 15. The outside diameter of the ring 20 is smaller than the inside diameter of the groove 30.

In a radial plane about the axis 15, the groove has a constant section having mainly two side walls 31, 32 and a bottom 33. The side walls 31 and 32 are substantially parallel to the plane 21. The bottom 33 is substantially perpendicular to the plane 21. The ring 20 is translationally guided between the two side walls 31 and 32. A functional clearance 35 is provided between the ring 20 and the bottom 33. The functional clearance 35 allows the translational freedom of the ring 20 with respect to the body 12. The value of the clearance 35 is selected depending on the positioning tolerances of the sphere 13 with respect to the body 12. The value of the clearance 35 is equal to the difference between the outside diameter of the ring 20 and the inside diameter of the groove 30. The functional clearance 35 also makes it possible to take account of dimensional variations in the sphere 13 during variations in temperature.

In practice, in order to insert the ring 20 into the body 12, the plate 14 may be formed from two half-plates that are fixed together following assembly of the ring 20. The groove 30 extends through the two half-plates. In FIGS. 1 and 2, only one of the half-plates is shown. The ring 20 and the two half-plates are joined together in two steps. Firstly, the ring is inserted into a first of the two half-plates in a translational movement, the direction of which is along the plane 21. Next, the second half-plate is inserted, still with the same translational movement, in order to close the groove 30 around the ring 20.

The ring 20 comprises a friction surface 40 that is intended to rub against the sphere 13 in order to brake the rotational movements thereof. The functional play 35 makes it possible to absorb the translational deviations in position of the sphere 13 in the plane 21. It is also advantageous to provide means for absorbing the deviations in position of the sphere 13 perpendicularly to the plane 21. To this end, the friction surface 40 has a cylindrical shape that extends perpendicularly to the plane 21. In other words, the friction surface 40 forms a cylindrical portion of axis 15. The height H of the cylinder, measured along the axis 15, is defined in a manner depending on the variations in height of the plane 21, which is a plane of symmetry of the sphere 13 on which a large diameter of the sphere 13 is located. More generally, the cylindrical surface 40 is configured to allow the sphere 13 to move translationally perpendicularly to the plane 21.

Alternatively, the friction surface 40 can have a frusto-conical shape having a small opening angle. The opening angle is oriented so as to generate a force on the sphere 13 in the direction of the rollers 16 and 17 and thus to press the sphere 13 against the rollers.

In FIG. 3, the friction surface 40 has been shown at a slight distance from the sphere 13. In operation, it will be understood that the friction surface 40 is pressed against the sphere under the effect of the elasticity of the spring 25. This pressure generates the friction torque used for braking the sphere 13.

The sphere 13 is liable to detach from the two rollers 16 and 17, for example under the effect of significant vibrations during operation or during transport of the trackball 10 prior to its installation in its working plane. Such detachment can result in the sphere 13 coming out of its housing. In order to limit this risk, it is advantageous to provide means for limiting the translational movement of the sphere 13 perpendicularly to the plane 21. In other words, the trackball 10 may comprise a stop against which the sphere 13 is able to come into abutment in order to avoid complete detachment of the sphere 13 from the body 12. This stop function is advantageously realized by the ring 20 itself, which then has a stop 45 that is able to limit a translational movement of the sphere 13 perpendicularly to the plane 21.

In order to avoid jamming of the sphere 13 in the ring 20, the stop 45 is advantageously a spherical surface portion that is complementary to that of the sphere 13 and extends in continuation of the friction surface 40 without a break in gradient. More precisely, the friction surface 40 has a cylindrical shape with the same diameter as the sphere 13. The largest diameter of the spherical surface portion is also the diameter of the sphere 13. The stop 45 slightly closes the opening of the ring 20 above the plane 21.

The invention claimed is:

1. A trackball comprising a body that is intended to be fixed to a workstation, a sphere that is rotatable with respect to the body, a set of sensors that provide information relating to the relative position of the sphere with respect to the body, and a brake for braking the rotational movements of the sphere with respect to the body, wherein the brake comprises a friction ring that encircles the sphere, the ring extending mainly in one plane, the ring being free to move translationally in the plane in which the ring extends, and wherein the friction ring is configured to linearly contact the sphere along a circumference of the sphere.

2. The trackball according to claim 1, wherein the plane in which the ring extends is a plane of symmetry of the sphere.

3. The trackball according to claim 1, wherein the friction ring is slit.

4. The trackball according to claim 1, wherein the brake comprises an annular spring that extends in the plane and compresses the friction ring against the sphere.

5. The trackball according to claim 1, wherein the body comprises a groove that extends in the plane, the groove having a constant section having principally two side walls and a bottom, the side walls being substantially parallel to the plane and the bottom being substantially perpendicular to the plane, a functional clearance being provided between the ring and the bottom, the functional clearance allowing the translational freedom of the ring.

6. The trackball according to claim 1, wherein the ring comprises a friction surface that is intended to rub against the sphere in order to brake the rotational movements thereof, the friction surface having a cylindrical shape that extends perpendicularly to the plane, the cylindrical shape being configured to allow the sphere to move translationally perpendicularly to the plane.

7. The trackball according to claim 6, wherein the stop has a spherical surface portion that is complementary to that of the sphere and extends in continuation of the friction surface without a break in gradient.

8. The trackball according to claim 1, wherein the ring comprises a stop that is able to limit a translational movement of the sphere perpendicularly to the plane.

* * * * *